United States Patent [19]

Tandai

[11] Patent Number: 5,063,469
[45] Date of Patent: Nov. 5, 1991

[54] COMPOSITE MAGNETIC HEAD ASSEMBLY HAVING REDUCED CROSS FEED BETWEEN WAITING AND READING HEADS

[75] Inventor: Takahiko Tandai, Aomori, Japan

[73] Assignees: Nakamichi Corporation, Tokyo; Nakamichi Fukushima Corporation, Fukushima, both of Japan

[21] Appl. No.: 438,704

[22] Filed: Nov. 17, 1989

[30] Foreign Application Priority Data

Nov. 18, 1988 [JP] Japan .................................. 63-291716

[51] Int. Cl.$^5$ ........................ G11B 5/127; G11B 5/115
[52] U.S. Cl. ................................... 360/128; 360/122; 360/125
[58] Field of Search ............... 360/128, 129, 110, 122, 360/119–120, 125

[56] References Cited

U.S. PATENT DOCUMENTS

| | | | |
|---|---|---|---|
| 4,672,495 | 6/1987 | Matsumoto | 360/125 |
| 4,797,767 | 1/1989 | Baus, Jr. | 360/122 X |
| 4,953,047 | 8/1990 | Toyama | 360/125 X |

FOREIGN PATENT DOCUMENTS 57-152513  9/1982  Japan .................................. 360/122

Primary Examiner—John H. Wolff
Attorney, Agent, or Firm—Dann, Dorfman, Herrell and Skillman

[57] ABSTRACT

A composite magnetic head particularly applicable to a half-inch tape cartridge employed in a streamer comprises a plurality of head assemblies and shielding blocks secured to the opposite sides of the respective head assemblies. One or more of thin plate made of magnetic material such as permalloy are attached to the front face of the magnetic head in suitable positions to improve cross-feed between adjacent two head assemblies.

7 Claims, 3 Drawing Sheets

COMPOSITE MAGNETIC HEAD ASSEMBLY HAVING REDUCED CROSS FEED BETWEEN WAITING AND READING HEADS

BACKGROUND OF THE INVENTION

1. Filed of the Invention

This invention relates to a magnetic head and more particularly to a composite magnetic head consisting of a plurality of head assemblies which is capable of reducing cross-feed between a writing head and a reading head.

2. Description of the Prior Art

Recently, an apparatus referred to in general as a streamer has been employed for preventing erroneous erasure of data recorded in a hard disc drive unit of a computer. A single-reel tape cartridge disclosed in U.S. Pat. No. 4,452,406, which is manufactured and sold by IMB as so-called "3480 cartridge", is now known as a preferable one to be used in the streamer. A specific format for the streamers utilizing the 3480 cartridge has been proposed by a HI/TC (Half Inch Tape Cartridge) group. According to this format, high-density recording and/or reproducing of 24 tracks can be made on a half-inch magnetic tape in the 3480 cartridge. The magnetic tape is running in both directions at high speed, while being in contact with a magnetic head of a write/-read/write, 2-channel, 6-gap type.

A suitable construction for the magnetic head in accordance with the format has also been proposed in, for example, Japanese patent provisional publications Nos. (Hei) 1-179204, 1-179206 through 1-179209, 1-179211 and 1-179212. The magnetic head disclosed in these publications will be described in reference to FIG. 5. A pair of 2-channel writing head assemblies 3 and 16, and a 2-channel reading head assembly 10 are secured on an aluminum base block 22. The first writing head assembly 3 is made operative with respect to the magnetic tape running in the forward direction and comprises a pair of ring cores $2_1$ and $2_2$ which are interposed between sliders $1_1$ and $1_2$ and sliders $1_2$ and $1_3$, via glass material spacers (not shown) of $50\sim70\mu$, respectively. Gaps in the order of $1.8\mu$ are formed in the respective ring cores $2_1$ and $2_2$. Coils (not shown) are provided only on the left sides of the ring cores $2_1$ and $2_2$, respectively. A guard block 5 having coil receiving recesses $4_1$ and $4_2$ is arranged on the left side of the first writing head assembly 3, whereas a shield block 7 having coil receiving recesses $6_1$ and $6_2$ on the right side thereof. The second writing head assembly 16 is made operative with respect to the magnetic tape running in the reverse direction. A pair of ring cores $16_1$ and $16_2$ having gaps in the order of $1.8\mu$ are interposed between sliders $15_1$ and $15_2$ and sliders $15_2$ and $15_3$, via glass material spacers (not shown) of about $50\sim70\mu$, respectively. The ring cores $16_1$ and $16_2$ are provided with coils (not shown) respectively on the right sides thereof. A shield block 18 having coil receiving recesses $17_1$ and $17_2$ is mounted on the left side of the second writing head assembly 16, and a guard block 20 having coil receiving recesses $19_1$ and $19_2$ on the right side thereof. The reading head assembly 10 for the magnetic tape running in the forward/reverse directions includes a pair of ring cores $9_1$ and $9_2$ interposed between sliders $8_1$ and $8_2$ and sliders $8_2$ and $8_3$, via glass material spacers (not shown) of about $50\sim70\mu$, respectively. Gaps in the order of $0.7\mu$ is formed in the respective ring cores $9_1$ and $9_2$. The ring cores $9_1$ and $9_2$ are provided on opposite sides thereof with coils (not shown), respectively, which are received in recesses $11_1$ and $11_2$ of a shield block 12 arranged on the left side of the assembly 10 and in recessed $13_1$ and $13_2$ of another shield block 14 arranged on the right side thereof. The composite magnetic head thus constructed is adapted to be in contact with the magnetic tape at specific portions $21_1$ through $21_5$ which are mirror-finished to guarantee smooth running of the magnetic tape. The respective ring cores, sliders, shield blocks and guard blocks are all made from ferrite. Between the shield blocks 7 and 12 and the shield blocks 14 and 18, there will leave gaps in a predetermined distance of about 1 mm.

With the magnetic head described above, magnetic flux which might leak out of the head assemblies 3, 10 and 16 will substantially be absorbed into the shield blocks and/or guard blocks arranged in the opposite sides thereof. There are provided gaps between the shield blocks 7 and 12; and 14 and 18, respectively. Moreover, the ring cores $2_1$ and $2_2$; and $16_1$ and $16_2$ of the writing head assemblies 3 and 16 are provided with the coils on the respective one side which is located far from the coils of the reading head assembly 10. By these reasons, even if the magnetic flux should leak out of the coil positions of the head assemblies, there will be substantially no risk of arising cross-feed between the heads.

In some cases a composite magnetic head of another type in which a first reading head, a single writing head and a second reading head are arranged in this order is preferred. Suppose that the above-described magnetic head of write/read/write arrangement is modified into such a read/write/read magnetic head. However, since the ring cores of the reading head should preferably be provided with the coils on the opposite sides thereof for the purpose of improving a S/N ratio, there may be a tendency to arise cross-feed between the writing head and one of the reading heads located in vicinity to the coiled side of the writing head. Accordingly, the above-described construction is not suitable to the read/-write/read magnetic head.

Various counterplans against the cross-feed problem have been proposed. For example, in Japanese patent publication No. (Sho) 50-31817, a shield block having high permeability is arranged between a writing head and a reading head and an auxiliary coil is wound around the shield block for generating a magnetic flux to cancel the cross-feed from the writing head. Provision of the auxiliary coil is troublesome and will therefore increase the manufacturing costs. Moreover, this counterplan is very difficult to be applied to a composite magnetic head because a substantial space for the auxiliary coil would not be available therein.

In Japanese patent publication No. (Sho) 50-5925, as well as in the above-recited publication No. (Sho) 50-31817, it has been tought that high frequency components of the cross-feed signal may be removed by shield plates attached to the front faces of the magnetic head, excluding the gaps. The shield plates are made of non-magnetic, conductive material such as gold, silver and copper. However, in order to cope with the cross-feed problem, it is necessary that the entire faces excluding the gaps should be covered with the shield plates, which could not be expected in the case of a composite magnetic head having complicated shape in the front faces.

SUMMARY OF THE INVENTION

It is therefore an object of this invention to provide a composite magnetic head capable of eliminating the defects of the prior arts.

Another object of this invention is to provide a novel construction and arrangement of a composite magnetic head particularly applicable to one employed in a streamer of a hard disc drive in a computer.

Still another object of this invention is to provide a composite magnetic head which is substantially free from cross-feed between a writing head and a reading head mounted in the composite magnetic head.

According to an aspect of this invention there is provided a composite magnetic head comprising a plurality of head assemblies each including a ring core composed of a pair of halves; shielding members of magnetic material arranged on opposite sides of the head assemblies, respectively; and at least one thin plate of magnetic material attached to front face of the composite magnetic head, the thin plate extending between one half of the ring core and the shielding member adjacent thereto.

According to another aspect of this invention there is provided a composite magnetic head comprising a writing head assembly including a first ring head composed of a first half provided with a coil and a second half secured to the first half; first and second shielding members of magnetic material arranged on opposite sides of the writing head assembly; a first reading head assembly arranged on the side of the first shielding member and including a second ring head composed of third and fourth halves secured to each other, each provided with a coil; third and fourth shielding members of magnetic material arranged on opposite sides of the first reading head assembly, the first and fourth shielding members being arranged in opposition to each other with a predetermined gap therebetween; a second reading head assembly arranged on the side of the second shielding member and including a third ring head composed of fifth and sixth halves secured to each other, each provided with a coil; fifth and sixth shielding members of magnetic material arranged on opposite sides of the second reading head assembly, the second and sixth shielding members being arranged in opposition to each other with a predetermined gap therebetween; and a thin plate of magnetic material attached to front faces of the fourth shielding member and the fourth half of the first reading head assembly.

According to still another aspect of this invention there is provided a composite magnetic head comprising a reading head assembly including a first ring head composed of first and second halves secured to each other, each provided with a coil; first and second shielding members of magnetic material arranged on opposite sides of the reading head assembly; a first writing head assembly arranged on the side of the first shielding member and including a second ring head composed of a third half provided with a coil and a fourth half secured to the third half; third and fourth shielding members of magnetic material arranged on opposite sides of the first writing head assembly, the first and fourth shielding members being arranged in opposition to each other with a predetermined gap therebetween; a second writing head assembly arranged on the side of the second shielding member and including a third ring head composed of a fifth half provided with a coil and a sixth half secured to the fifth half; fifth and sixth shielding members of magnetic material arranged on opposite sides of the second writing head assembly, the second and sixth shielding members being arranged in opposition to each other with a predetermined gap therebetween; a first thin plate of magnetic material attached to front faces of the third shielding member and the third half of said first writing head assembly; and a second thin plate of magnetic material attached to front faces of the fifth shielding member and the fifth half of the second writing head assembly.

BRIEF DESCRIPTION OF THE DRAWINGS

Further objects and advantages of this invention can be fully understood from the following detailed description when read in conjunction with the accompanying drawings in which.

DETAILED DESCRIPTION OF THE EMBODIMENT

A composite magnetic head according to an embodiment of this invention will now be described in detail with reference to FIG. 1 and FIG. 2. In these drawings, parts and members identical to those in the prior art shown in FIG. 5 are accompanied by the same reference numbers and detailed explanation thereof may not be repeated.

Figure 1:
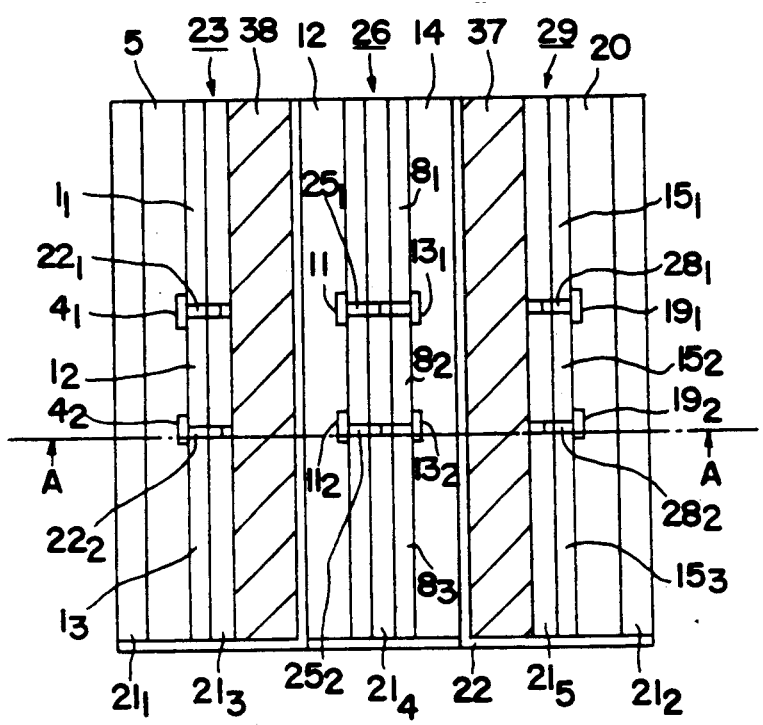
FIG. 1 is a front view showing a composite magnetic head embodying the invention.
Figure 2:
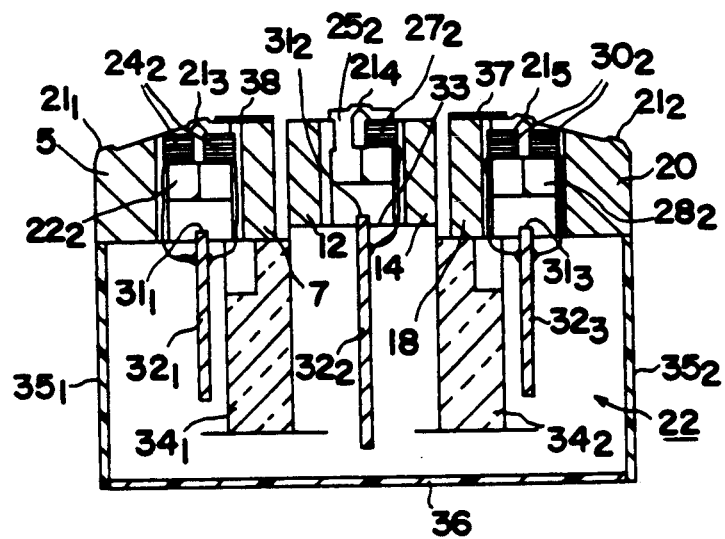
FIG. 2 is a cross-section taken along the line A—A in FIG. 1.
Figure 5:
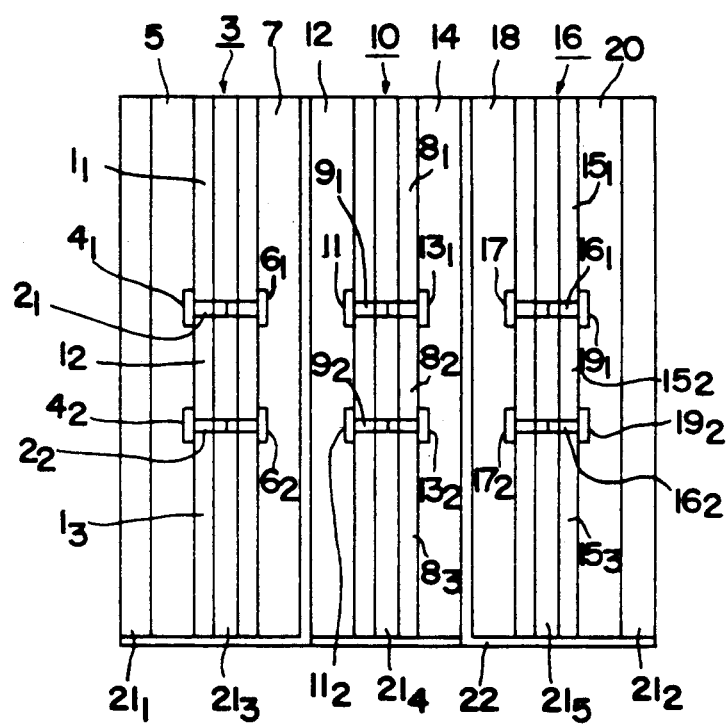
FIG. 5 is a front view showing a prior art composite magnetic head.

The composite magnetic head shown in FIGS. 1 and 2 is constructed in such a manner that respective head assemblies are arranged in the order of read/write/read, which is different from the arrangement in FIG. 5. More particularly, first and second 2-channel reading head assemblies 23 and 29 are mounted at opposite sides on an aluminum base block, between which there is also mounted a 2-channel writing head assembly 26. The first reading head assembly 23, which is made operative with respect to a magnetic tape (not shown) running in the reverse direction, comprises a pair of ring cores $22_1$ and $22_2$. The ring cores $22_1$ and $22_2$ are interposed between sliders $1_1$ and $1_2$ and sliders $1_2$ and $1_3$, via glass material spacers (not shown), respectively. Gaps in the order of $0.7\mu$ are formed in the respective ring cores $22_1$ and $22_2$. Coils $24_1$ and $24_2$ are provided around both halves of the ring cores $22_1$ and $22_2$, though only the latter coil $24_2$ is seen in FIG. 2. A guard block 5 having coil receiving recesses $4_1$ and $4_2$ is arranged on the left side of the first reading head assembly 23, whereas a shield block 7 having coil receiving recesses $4_1$, and $4_2$ on the right side thereof. The second reading head assembly 29 is made operative with respect to the magnetic tape running in the forward direction. A pair of ring cores $28_1$ and $28_2$ having gaps in the order of $0.7\mu$ are interposed between sliders $15_1$ and $15_2$ and sliders $15_2$ and $15_3$, via glass material spacers (not shown), respectively. The ring cores $28_1$ and $28_2$ are respectively provided with coils $30_1$ and $30_2$ (only the latter being seen in FIG. 2) around opposite halves thereof. A shield block 18 having coil receiving recesses $17_1$ and $17_2$ is mounted on the left side of the second reading head assembly 29, and a guard block 20 having coil receiving recesses $19_1$ and $19_2$ on the right side thereof. The writing head assembly 26 for the magnetic tape running in the forward/reverse directions includes a pair of ring cores $25_1$ and $25_2$ interposed between sliders $8_1$ and $8_2$ and sliders $8_2$ and $8_3$, via glass material spacers (not shown), respectively. Gaps in the order of $0.7\mu$ is formed in the respective ring cores $25_1$ and $25_2$. The ring cores $25_1$ and $25_2$ are provided on right-hand halves thereof with coils $27_1$ and $27_2$ (only the latter being seen in FIG. 2), respectively, which are received in recesses $11_1$ and $11_2$ of a shield block 12 arranged on the left side of the assembly 10. Another shield block 14 arranged on the right side of the writing head assembly 26 includes recesses $13_1$ and $13_2$ which, in this embodiment, will receive no coil.

Portions $21_3$ to $21_5$ of the respective head assemblies 23, 26 and 29 are mirror-finished to provide smooth contact with the running magnetic tape. As can be seen in FIG. 2, the first and second reading head assemblies 23 and 29 and the shield blocks and the guard blocks associated therewith are mounted on the same level pedestrals of the base block 22, whereas the writing head assembly 26 and the shield blocks 12 and 14 are mounted on a center pedestral 33 of a higher level. The base block 22 includes body portions $34_1$ and $34_2$, and is contoured by a pair of side cover $35_1$ and $35_2$ and a bottom cover 36.

The bottoms of the sliders 1 ($1_1$, $1_2$ and $1_3$), 8 ($8_1$, $8_2$ and $8_3$) and 12 ($15_1$, $15_2$ and $15_3$) are respectively formed with grooves $31_1$, $31_2$ and $31_3$ extending in a direction perpendicular to the tape running directions. Terminal boards $32_1$, $32_2$ and $32_3$ are inserted into the grooves $31_1$, $31_2$ and $31_3$, respectively, and secured thereat by means of epoxy resin. The terminal boards $32_1$, $32_2$ and $32_3$ thus provided will act as reinforcements and prevent separation of the ring cores and the sliders in the respective head assemblies 23, 26 and 29.

In the composite magnetic head shown in FIGS. 1 and 2, the coils $27_1$ and $27_2$ are wound around tha right-hand halves of the ring cores $25_1$ and $25_2$ in the writing head assembly 26. The position of the coils $27_1$ and $27_2$ are relatively close to the ring cores $28_1$ and $28_2$ in the second reading assembly 29 so that the cross-feed characteristic may be deteoriated in the forward direction. To cope with this, a shiled plate 37 of permalloy in an about 0.1 mm thickness is attached onto the upper face of the second reading assembly 29 in an area extending from the shield block 18 to almost the contact portion $21_5$.

It has been found by experiment that provision of the shield plate 37 would improve the cross-feed characteristic by approximately 16~20 dB. In this connection, it has also been found that improvement of the cross-feed may be dependent upon position of the shield plate 37. Table I depicts the results of the inventor's experiment as to relationship between the shield plate position and improvement of the cross-feed. In this table, A represents a position of the shield plate covering an area extending between the contact portions $21_1$ and $21_3$, B a position of the shield plate covering an area from the contact portion $21_3$ to the shield block 7, C a position covering an area from the shield block 12 to the contact portion $21_4$, D a position covering an area from the contact portion $21_4$ to the shield block 14, E a position covering an area from the shield block 18 to the contact portion $21_5$, and F a position covering an area between the contact portions $21_5$ and $21_2$.

TABLE I

| SHIELD PLATE POSITION | IMPROVEMENT OF CROSS-FEED |
| --- | --- |
| A | 1~2 dB |
| B | 0~1.5 dB |
| C | 0~1.5 dB |
| D | 0~1.5 dB |
| E | 16~20 dB |
| F | 1~2 dB |

It can be noted in Table I that the cross-feed can be improved to a great extent by the shield plate 37 arranged in position E. The shield plate 37 should preferably be shifted within position E to find a definite position providing the most improved cross-feed characteristic. Although the shield plate 37 may not be attached to the entire face of the shield block 18, it is at least necessary that the shield plate should extend from the left of the contact portion $21_5$ to completely cover the coil receiving recesses $17_1$ and $17_2$ of the shield block 18.

In the embodiment shown, a stainless thin plate 38 is attached in position B to provide a balanced construction of the magnetic head. The plate 38 will not at all contribute to improvement of the cross-feed and therefore may be omitted.

It will be understood that, if the coils $27_1$ and $27_2$ be provided on the left-hand half of the ring core $25_1$ and $25_2$ respectively, the shield plate 37 should be attached to the first reading head assembly 23 in position B, in which case the thin plate 38 may be arranged in position E.

Figure 3:
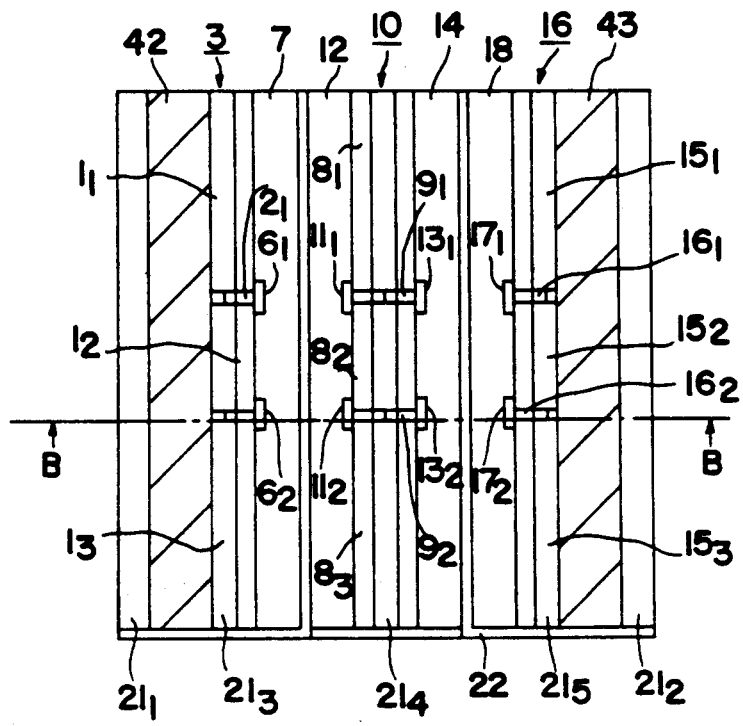
FIG. 3 is a front view showing another embodiment of a composite magnetic head.
Figure 4:
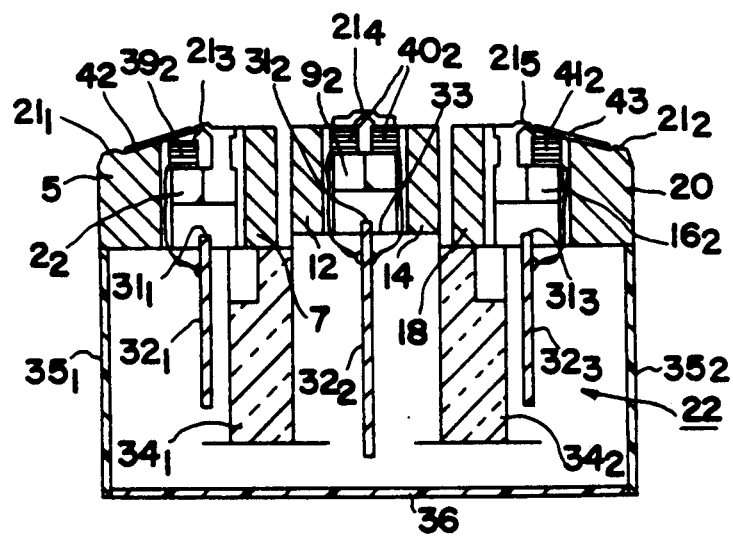
FIG. 4 is a cross-section taken along the line B—B in FIG. 3.

The concept underlying the invention may be applied to the magnetic head of the write/read/write construction which is typically illustrated in FIG. 5. An embodiment thereof is shown in FIG. 3 and FIG. 4, in which the portions and members identical to those in FIG. 2 and FIG. 5 are accompanied by the same reference numerals and detailed explanation thereof will be omitted. This embodiment will improve the cross-feed characteristic which might be in some case of an unsatisfactory level, thereby improving an yield of the products and reducing the manufacturing costs.

As having been described with respect to the prior art, the ring cores $2_1$ and $2_2$ in the first writing head assembly 3 are respectively provided with the coils $39_1$ and $39_2$ around the left-hand halves thereof. The ring cores $16_1$ and $16_2$ in the second writing head assembly 16 are respectively provided with the coils $41_1$ and $41_2$ around the right-hand halves thereof. The ring cores $9_1$ and $9_2$ in the reading head assembly 10 are respectively provided with the coils $40_1$ and $40_2$ around the opposite halves thereof. In FIG. 4, only the coils $39_2$, $40_2$ and $41_2$ can be seen.

In the embodiment, a first shield plate 42 is attached to the first writing head assembly 3 in an area extending between the contact portions $21_1$ and $21_3$, and a second shield plate 43 is attached to the second writing head assembly 16 in an area extending between the contact portions $21_5$ and $21_2$. These shield plates 42 and 43 are substantially identical and made of permalloy having a thickness of about 0.1 mm.

The following Table II represents the results of the inventor's experiment regarding relationship between the shield plate position and improvement of the cross-feed. Positions A to F referred to in Table II are identical to those defined in Table I.

TABLE II

| SHIELD PLATE POSITION | IMPROVEMENT OF CROSS-FEED |
| --- | --- |
| A | 10~15 dB |
| B | 2~3 dB |
| C | 0~1 dB |
| D | 0~1 dB |
| E | 2~3 dB |
| F | 10~15 dB |

As can be noted in Table II, the cross-feed can be improved by 10~15 dB when the shield plate is arranged in position A or F. The shield plate arranged in other position will not be effective for improving the cross-feed to a great extent. While slightly shifting the shield plates 42 and 43 within positions A and F, respectively, definite positions thereof can be determined to provide the most improved cross-feed. Although the entire surfaces between the contacts portions $21_1$ and $21_3$; and $21_5$ and $21_2$ may not be overlaid with the shield plates 42 and 43, respectively, it has been found necessary that the width of the shield plate 42 should be enough to extend from the left of the contact portion $21_3$ to completely cover the coil receiving recesses $4_1$ and $4_2$ of the guard block 18, and that the width of the shield plate 43 should be enough to extend from the right of the contact portion $21_5$ to completely cover the coil receiving recesses $17_1$ and $17_2$ of the guard block 20.

Although the invention has been described in conjunction with a specific embodiment thereof, it is to be understood that many variations and modifications may be made without departing from spirit and scope of the invention as defined in the appended claims.

What is claimed is:

1. A composite magnetic head comprising:
   a writing head assembly including a first ring head composed of a first half provided with a coil and a second half secured to said first half;
   first and second shielding members of magnetic material arranged on opposite sides of said writing head assembly;
   a first reading head assembly arranged on the side of said first shielding member and including a second ring head composed of third and fourth halves secured to each other, each provided with a coil;
   third and fourth shielding members of magnetic material arranged on opposite sides of said first reading head assembly, said first and fourth shielding members being arranged in opposition to each other with a predetermined gap therebetween;
   a second reading head assembly arranged on the side of said second shielding member and including a third ring head composed of fifth and sixth halves secured to each other, each provided with a coil;
   fifth and sixth shielding members of magnetic material arranged on opposite sides of said second reading head assembly, said second and sixth shielding members being arranged in opposition to each other with a predetermined gap therebetween; and
   a thin plate of magnetic material attached to front faces of said fourth shielding member and said fourth half of said first reading head assembly.

2. The composite magnetic head according to claim 1 wherein said thin plate is made of permalloy.

3. The composite magnetic head according to claim 1 wherein said thin plate is positioned to cover substantially the entire front face of said fourth half of said first reading head assembly and further extend to completely cover a recess formed with said fourth shielding member for receiving the coil formed around said fourth half.

4. A composite magnetic head comprising:
   a reading head assembly including a first ring head composed of first and second halves secured to each other, each provided with a coil;
   first and second shielding members of magnetic material arranged on opposite sides of said reading head assembly;
   a first writing head assembly arranged on the side of said first shielding member and including a second ring head composed of a third half provided with a coil and a fourth half secured to said third half;
   third and fourth shielding members of magnetic material arranged on opposite sides of said first writing head assembly, said first and fourth shielding members being arranged in opposition to each other with a predetermined gap therebetween;
   a second writing head assembly arranged on the side of said second shielding member and including a third ring head composed of a fifth half provided with a coil and a sixth half secured to said fifth half;
   fifth and sixth shielding members of magnetic material arranged on opposite sides of said second writing head assembly, said second and sixth shielding members being arranged in opposition to each other with a predetermined gap therebetween;
   a first thin plate of magnetic material attached to front faces of said third shielding member and said third half of said first writing head assembly; and
   a second thin plate of magnetic material attached to front faces of said fifth shielding member and said fifth half of said second writing head assembly.

5. The composite magnetic head according to claim 4 wherein said first and second thin plates are made of permalloy.

6. The composite magnetic head according to claim 4 wherein said first thin plate is positioned to cover substantially the entire front face of said third half of said first writing head assembly and further extend to completely cover a recess formed with said third shielding member for receiving the coil formed around said third half.

7. The composite magnetic head according to claim 4 wherein said second thin plate is positioned to cover substantially the entire front face of said fifth half of said second writing head assembly and further extend to completely cover a recess formed with said fifth shielding member for receiving the coil formed around said fifth half.

* * * * *

UNITED STATES PATENT AND TRADEMARK OFFICE
CERTIFICATE OF CORRECTION

PATENT NO. : 5,063,469
DATED : November 5, 1991
INVENTOR(S) : Takahiko TANDAI It is certified that error appears in the above-identified patent and that said Letters Patent is hereby corrected as shown below:

Cover page, in the Title, delete "WAITING" and insert --WRITING--.

Column 1, line 4 (in the Title), delete "WAITING" and insert --WRITING--.

Column 4, line 57, delete "$4_1$ and $4_2$" and insert --$6_1$ and $6_2$--.

Signed and Sealed this

Thirteenth Day of April, 1993

Attest:

STEPHEN G. KUNIN

Attesting Officer     Acting Commissioner of Patents and Trademarks